United States Patent
Aoyama et al.

(10) Patent No.: US 6,726,869 B2
(45) Date of Patent: Apr. 27, 2004

(54) METHOD OF MAKING GOLF BALL MOLD HALVES AND GOLF BALLS THEREFROM

(75) Inventors: Steven Aoyama, Marion, MA (US); Herbert C. Boehm, Norwell, MA (US); Christopher Cavallaro, Lakeville, MA (US)

(73) Assignee: Acushnet Company, Fairhaven, MA (US)

( * ) Notice: Subject to any disclaimer, the term of this patent is extended or adjusted under 35 U.S.C. 154(b) by 598 days.

(21) Appl. No.: 09/790,618

(22) Filed: Feb. 23, 2001

(65) Prior Publication Data

US 2002/0158364 A1 Oct. 31, 2002

(51) Int. Cl.⁷ .......................... B29C 39/10; B29C 45/14
(52) U.S. Cl. ..................................... 264/275; 264/279.1
(58) Field of Search .............................. 264/275, 279.1; 473/378; 425/121, 116

(56) References Cited

U.S. PATENT DOCUMENTS

| 3,831,423 A | 8/1974 | Brown et al. |
| 5,798,071 A | * 8/1998 | Boehm ........................ 264/275 |
| 5,908,359 A | 6/1999 | Shimosaka et al. |
| 6,042,768 A | 3/2000 | Calabria et al. |

FOREIGN PATENT DOCUMENTS

| WO | WO 96/40481 | * 12/1996 |

\* cited by examiner

Primary Examiner—Edmund H. Lee
(74) Attorney, Agent, or Firm—Swidler Berlin Shereff Friedman, LLP

(57) ABSTRACT

A method of making molds for the production of golf balls is disclosed. A hob is made having an imperfectly spherical arcuate surface that is composed of at least two different arcs in continuous arrangement to each other. A mold half is formed using the hob so that the imperfectly spherical hob creates an imperfectly spherical golf ball cavity within the mold half. When used to make golf balls, the imperfectly spherical cavity results in golf balls having a higher degree of sphericity than golf balls made by spherical hobs and mold half cavities.

11 Claims, 5 Drawing Sheets

METHOD OF MAKING GOLF BALL MOLD HALVES AND GOLF BALLS THEREFROM

FIELD OF THE INVENTION

This invention relates to a method of making golf ball molds and, more particularly, to a method of making imperfectly spherical golf ball mold halves and golf balls therefrom.

BACKGROUND OF THE INVENTION

Golf ball molds are used in the production of golf balls of both the wound and solid types. Normally upper and lower mold halves are used to make one golf ball and each of the mold halves is generally the size of one half of the golf ball. When the two mold halves are mated, they will form a generally spherical interior with an equator at approximately the middle of the golf ball.

The golf ball mold halves can be made using a master pattern or hob that approximately corresponds to the dimensions of a finished, unpainted golf ball. This hob can then be used to impress a plurality of mold blanks to make a plurality of golf ball mold halves. An example of this process is disclosed in U.S. Pat. No. 3,831,423 to Brown, et. al.

In the past, the hob used to make some golf ball molds had an outer surface that was a section of a sphere. This surface is indented with dimples or other texture that is typically applied to a golf ball's surface. The golf ball mold that is made from this hob thus has an interior surface in the shape of a sphere, with dimple or other texture forming projections extending inwardly from the spherical surface. Surprisingly, the golf ball that is formed by this type of mold is usually not perfectly spherical. Rather, it usually has a first diameter when measured generally perpendicular to an equator plane or pole-to-pole, a similar second diameter when measured generally parallel to the equator plane, and a third somewhat smaller diameter when measured in orientations roughly half way between the first two orientations. Since these diameters are not equal, the ball is not perfectly spherical. This is most notable in a compression molding process, but occurs with other processes as well.

The United States Golf Association (USGA), the organization that sets the rules of golf in the United States, has instituted a rule that a ball must not be manufactured to have properties which differ from those of a spherically symmetrical ball. The non-spherical shape of golf balls created using spherical hobs creates difficulty in complying with this symmetry rule. Various methods can be used to compensate for the non-spherical shape of a ball. For example, U.S. Pat. No. 5,908,359 to Shimosaka, et al. discloses a method of arranging and dimensioning the dimples on the surface of a golf ball to compensate aerodynamically for the effect of the non-spherical shape.

Therefore, it is desired to have a method of making golf ball mold halves so that a golf ball produced from such a method is more spherical.

SUMMARY OF THE INVENTION

The present invention is directed to an improved method of making golf ball mold halves. The mold halves are made by impressing a golf ball hob into a mold blank and applying pressure to form an impression of the hob in the mold blank. The golf ball hob has an arcuate surface that is defined by at least two arcs having different center points.

In one embodiment, the arcuate surface has a profile from its equator edge to its pole, and the profile is composed of at least two different arcs. In another embodiment, the profile of the arcuate surface is comprised of three different arcs. Preferably, each of the three arcs extends through an angle of 30 degrees.

According to another aspect of the invention, the radii of the arcs near the pole and near the equator are larger than the radius of the arc in-between. Preferably, the radius of the arc nearest the pole and the radius of the arc nearest the equator are equal.

According to one embodiment, each arc is continuously arranged to each adjacent arc. Preferably, the adjacent arcs are in a tangential arrangement where they meet each other.

The present invention also includes a method of making golf balls. The balls are made using a pair of mold halves. Each half includes a cavity with an arcuate surface defined by at least two arcs with different center points. A golf ball subassembly is placed into a golf ball mold cavity defined by the pair of mold halves, and a cover material is disposed between the subassembly and the golf ball mold halves.

In one embodiment, the subassembly is a solid, one-piece core. In another embodiment, the subassembly is a solid polybutadiene center surrounded by at least one intermediate layer. Preferably, the at least one intermediate layer is an ionomer resin having an acid content of less than 20 weight percent.

In another embodiment, the subassembly is a two-piece core having a solid center and an intermediate layer wound around it. Alternatively, the center is liquid filled.

The cover material can be a thermoset polyurethane, a thermoplastic urethane, a balata, a thermoplastic elastomer, a thermoset urethane, a castable urethane, reaction injection molded urethane, or a material that is at least partially an ionomer. Preferably, the cover is castable polyurethane.

DETAILED DESCRIPTION OF THE PREFERRED EMBODIMENTS

Figure 1:
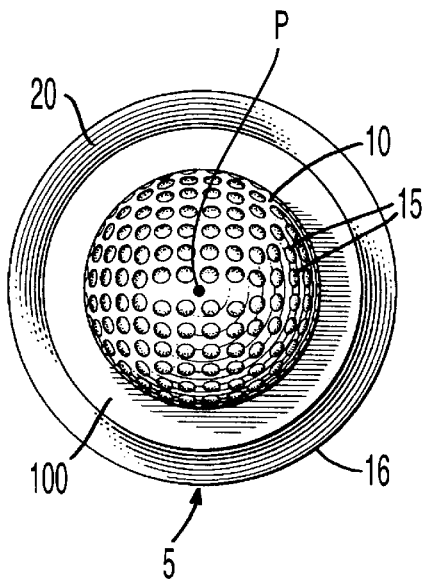
FIG. 1 is a top view of a hob for use in a method of the present invention.
Figure 2:
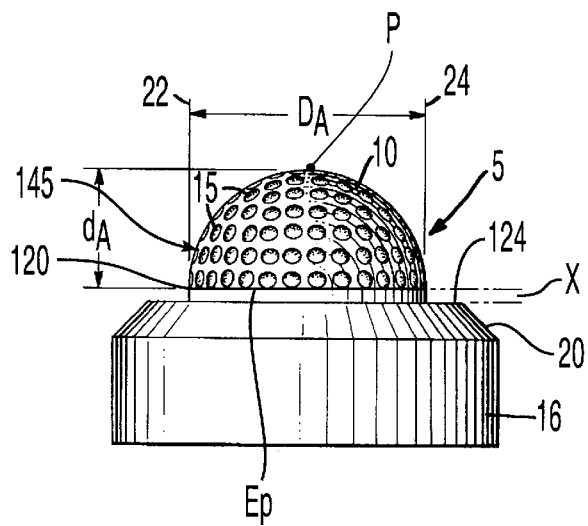
FIG. 2 is a side view of the hob of FIG. 1.

Referring to FIG. 1, a hob 5 is shown and includes an arcuate surface 10. Arcuate surface 10 may be substantially the same size as a portion of a finished, unpainted golf ball. Since a golf ball 240 (shown in FIG. 7C) will normally shrink when it is removed from a golf ball mold, the arcuate surface 10 may alternatively be slightly larger than the desired size of the finished, unpainted golf ball. A diameter $D_A$ of the arcuate surface 10 is shown in FIG. 2. Hob 5 may be made of soft brass, silicon bronze, stainless steel, or any other material known to one of ordinary skill in the golf ball manufacturing art to be suitable for forming golf ball molds.

Figure 6:
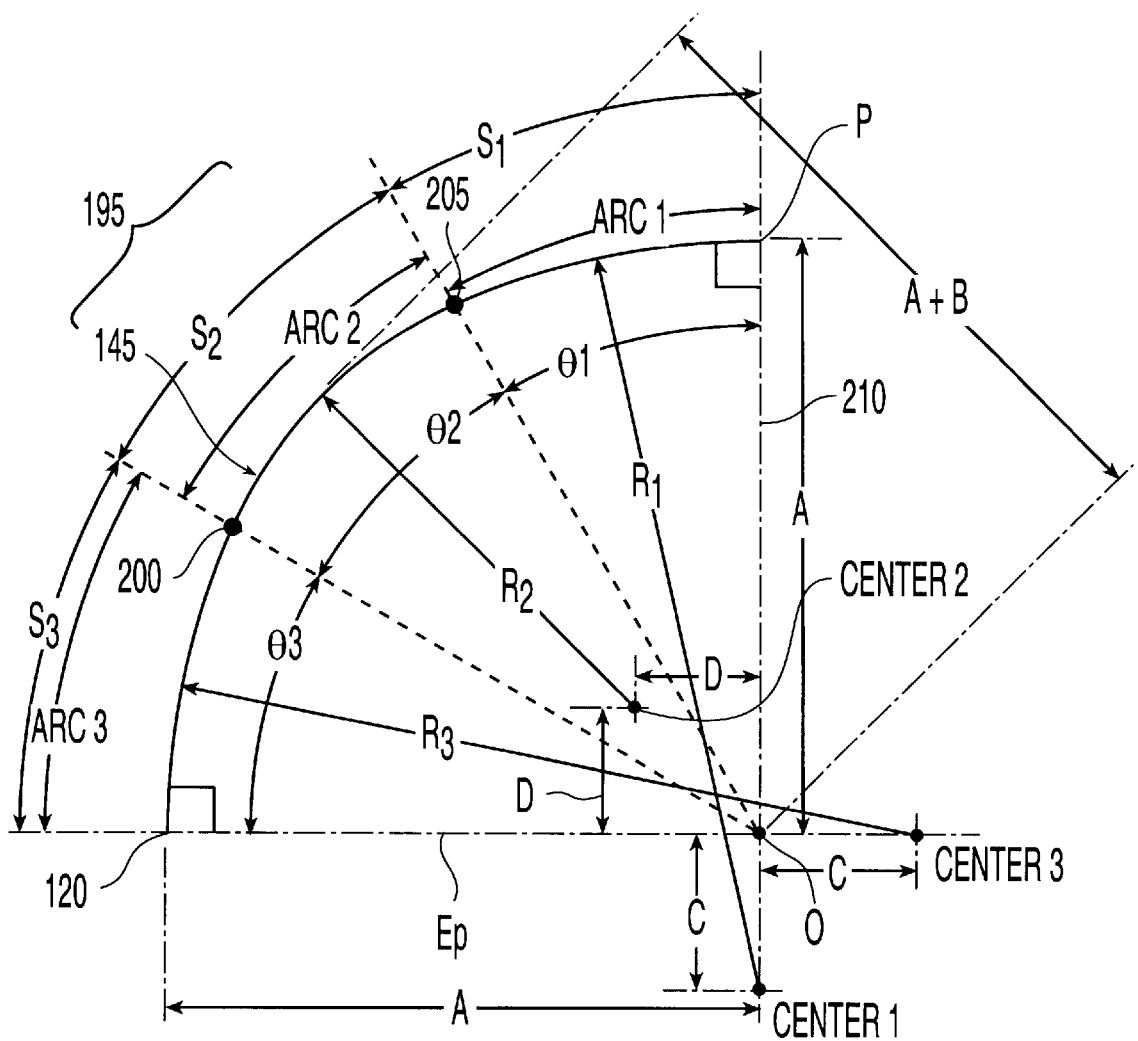
FIG. 6 is an enlarged, profile of a portion of an arcuate surface of the hob of FIG. 2.
Figure 7:
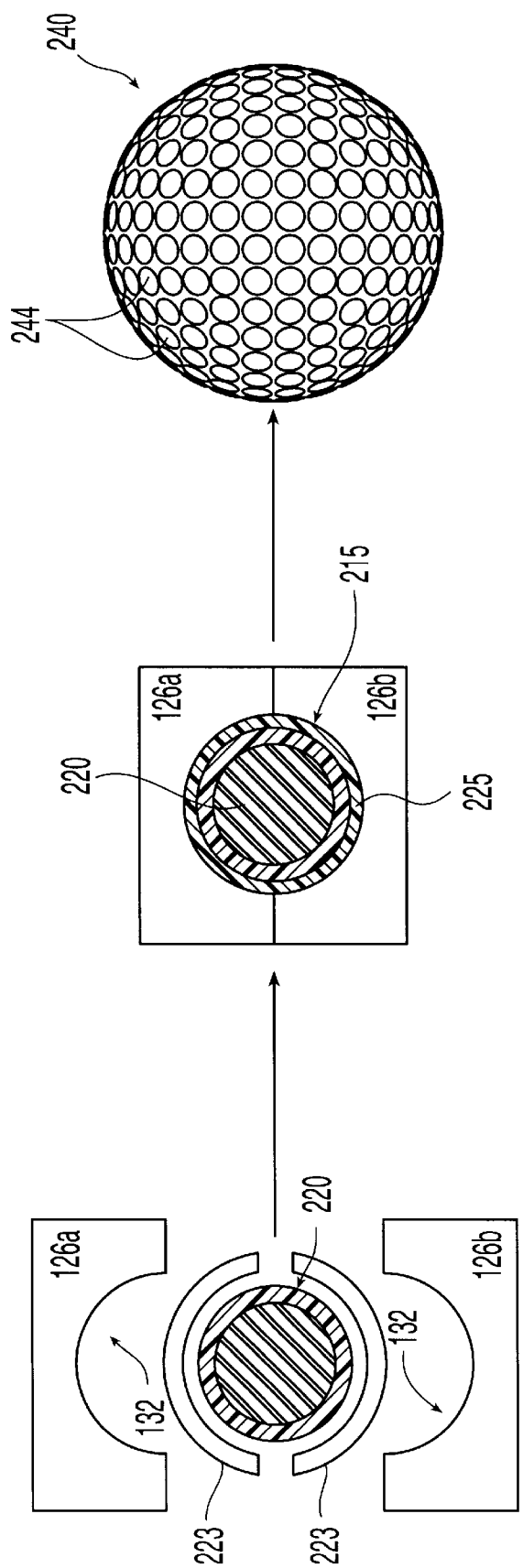
FIGS. 7A–C are schematic representations showing a method of making a golf ball according to the present invention.

Arcuate surface 10 has dimples 15 therein which again are substantially the same size as dimples 244 (as shown in FIG. 7C) on the finished, unpainted golf ball 240 but, again because of the shrinking, dimples 15 will usually be slightly larger than the dimples on the finished golf ball. Arcuate surface 10 will be discussed in more detail hereinafter with reference to FIG. 6.

Referring to FIG. 2, the hob 5 further includes a base 16 which is preferably provided with tapered section 20 to avoid having sharp edges on the hob. The Diameter $D_A$ of the arcuate surface 10 of the hob 5 is measured from the widest points 22 and 24 at the hob equator. The depth $d_A$ of the arcuate surface is the vertical distance from the highest point or pole P of the hob 5 to the equator plane of the hob 5.

Figure 3:
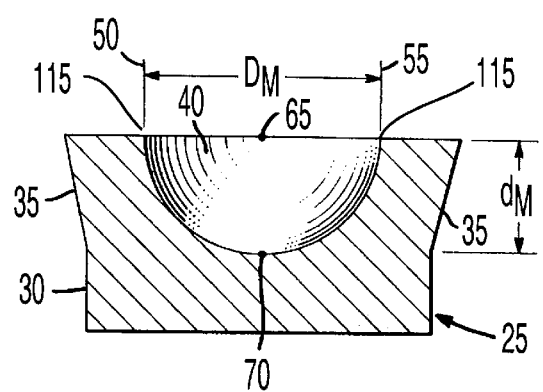
FIG. 3 is a cross-sectional view of a mold blank for use in a method of the present invention.

Referring to FIG. 3, a mold blank 25 is shown. The blank 25 comprises a base section 30 and a downwardly tapered sidewall 35. The function of the tapered sidewall 35 will be discussed hereinafter with reference to FIG. 4. Cavity 40 is provided in the mold blank 25 for receiving the golf ball hob 5. The mold cavity 40 has a diameter $D_M$ and a depth $d_M$.

The diameter and depth of the cavity 40 and arcuate surface 10 are measured in the following manner. Referring to FIG. 3, the diameter $D_M$ of the cavity 40 is taken at the upper surface of the blank or equator of the cavity from point 50 to point 55. The depth $d_A$ is a vertical distance from center point 65 which is in the center of the top of the cavity 40 to a point 70 which is directly below point 65 and will be the deepest part of the cavity 40.

Referring to FIGS. 2 and 3, it has been found desirable to have a depth $d_M$ of the mold blank 25 that is slightly less than the depth $d_A$ of the arcuate surface 10 of the hob 5. It has also been found desirable for the cavity 40 diameter $D_M$ to be greater than the diameter $D_A$ of the arcuate surface 10 of the hob 5.

Figure 4:
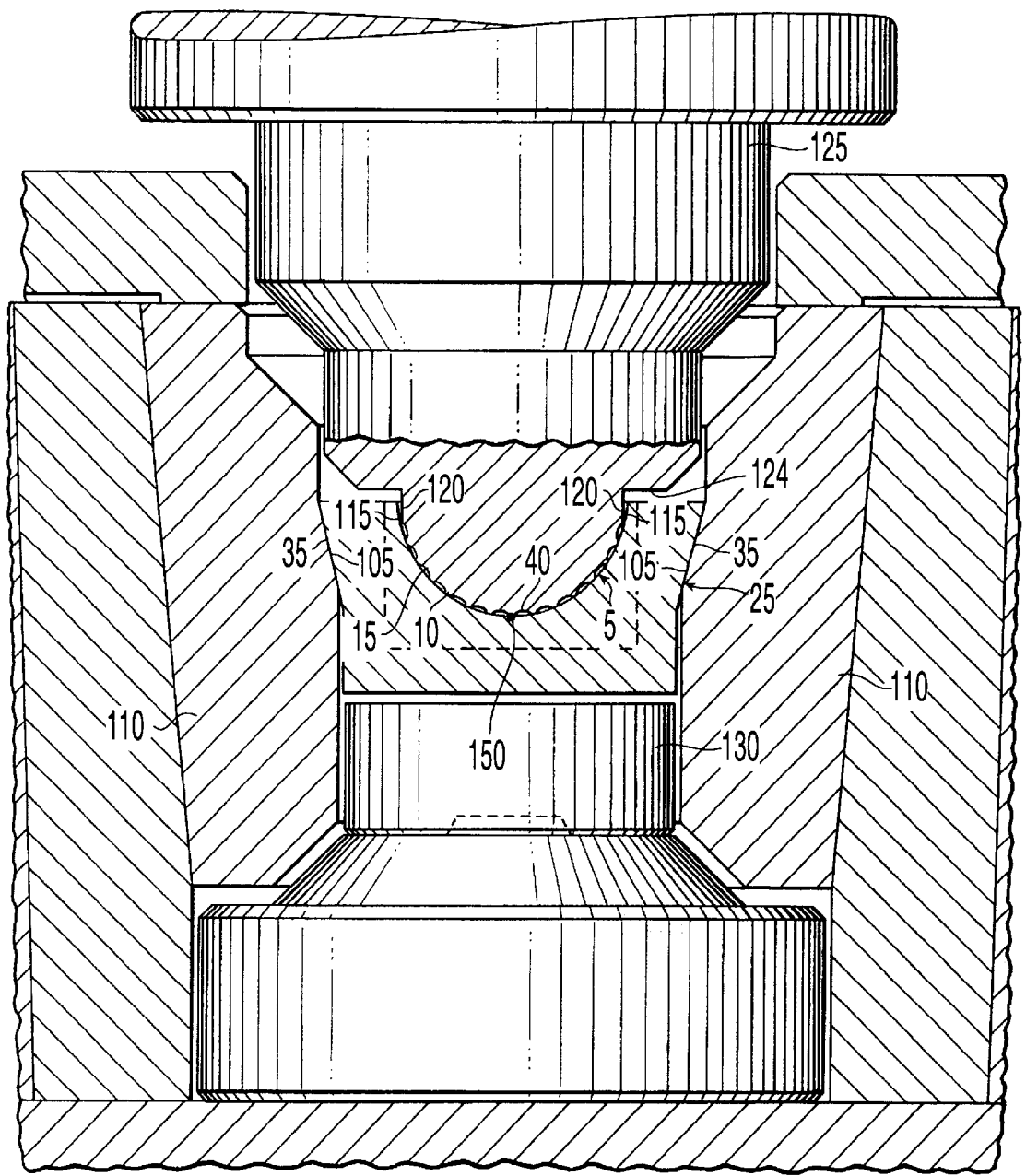
FIG. 4 is a side view of an apparatus for making golf ball molds in accordance with the present invention.

Referring to FIG. 4, the mold blank 25 is shown with the hob 5 resting therein. Tapered sidewall 35 of the mold blank 25 bears against tapered sidewall 105 of a mold blank receiving member 110. When pressure is applied to hob 5 by piston 125 from a power source (not shown) such as a hydraulic press, arcuate surface 10 will press against cavity 40. Continued application of pressure to hob 5 will exert force upon mold blank 25 and will result in pressure on tapered sidewall 35 of the mold blank 25 from tapered sidewall 105 of the mold receiving member 110. This will cause an equator edge 115 of the mold blank 25 to press against an equator edge 120 of the hob 5 so that the dimples 15 in the area of the equator will be fully impressed. As shown in FIG. 3, equator edge 115 of the mold blank 25 is located at the equator of the mold cavity 40, on the upper surface of the mold blank 25. Equator edge 120 of the hob 5, best depicted in FIG. 2, is the circumferential edge of the hob 5 defined by the equator plane $E_p$, and is distanced from the base 16 upper surface 124 of the hob 5 by a small distance X, easily determined by one of ordinary skill in the art.

Figure 5:
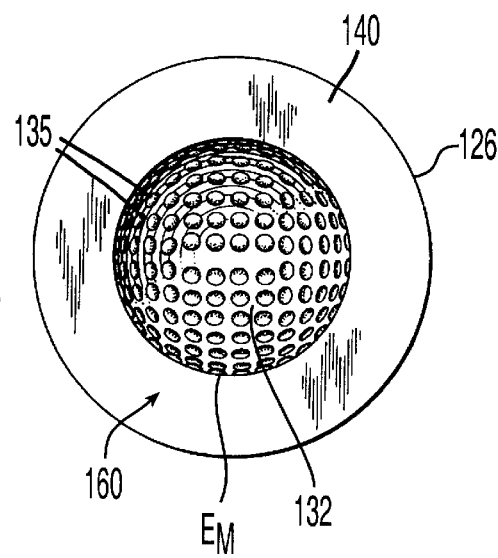
FIG. 5 is a top view of a golf ball mold half made in accordance with the present invention.

Referring again to FIG. 4, since the mold blank cavity 40 is preferably of slightly less depth than the hob 5, the hob 5 under the pressure from piston 125 will be forced into the mold blank 25 to its base upper surface 124 and the dimples 15 from the hob will be accurately impressed on the bottom of the mold blank 25 forming a mold half 126 (as shown in FIG. 5). The mold cavity 132, as shown in FIG. 5, will have a shape which is substantially a negative of the shape of the arcuate surface 10 of the hob 5. The above process forms a mold half 126 from the mold blank 25.

Referring to FIGS. 4 and 5, after the hob 5 has thus formed the mold half 126, the hob 5 and mold half are removed from the mold receiving member 110 suitably by means of a piston 130 which again may be activated by hydraulic means (not shown). The mold half 126 is then removed from the hob 5. The hob 5 impresses the mold cavity 132 and protrusions 135 in the blank.

Preferably, the equator $E_M$ of the mold half 126 is made of a greater diameter than the equator edge 120 of the hob 5. Because of this difference in diameter of the equator of the mold half 126 and the hob 5, the mold half 126 will frequently just fall off the hob 5. Where the equator edge 120 of the hob 5 and the mold half 126 have been made of the same diameter or in other cases where the mold half 126 will not readily fall off the hob 5, the mold half 126 can be removed by heating around the tapered sidewall 35 (as shown in FIG. 3). When this is necessary or desirable, it is preferable to make the mold blank 25 of a material having a higher coefficient of expansion than the coefficient of expansion of the hob 5 but this is not required. The mold blank 25 may be heated during the forming process if desired but it has been found that this is not necessary, especially in the case where the mold half is larger than the hob.

Referring again to FIG. 5, the protrusions 135 in golf ball cavity 132 form indentations or dimples in the golf ball when the ball is molded. The body 140 of the mold half 126 will usually be substantially reduced in diameter when the mold is used for forming golf balls.

To increase the sphericity of the golf ball manufactured with these molds, the hob 5, and the resulting golf ball cavity 132 are not designed to have a perfectly spherical surface. Rather, the hob 5 has an arcuate surface that is defined by at least two arcs having different center points. Hob 5 may alternately have an arcuate surface that is defined by at least three arcs. The imperfectly spherical hob creates a golf ball cavity 132 that has a smaller diameter when measured perpendicular or parallel to the plane with the equator $E_M$ than when measured at locations in between. With properly selected dimensions, this imperfectly spherical golf ball cavity 132 compensates for the tendency to manufacture golf balls that are larger pole-to-pole and across the equator than they are at positions in-between, which tendency is most notable in a compression molding process, but may occur with other processes as well. Thus, golf balls manufactured using the imperfectly spherical golf ball cavity 132 are more spherical than golf balls manufactured using prior art molds.

FIG. 6 shows a continuous profile 145 for a preferred embodiment of the arcuate surface 10 of the hob 5 (as shown in FIG. 2). In the illustration, dimensions C and D are exaggerated to better illustrate these features. The profile 145 extends from the pole P of the hob 5 to the equator edge 120 of the hob 5. The profile from pole P to equator edge 120 is composed of three arcs designated a polar zone arc, ARC 1; an intermediate zone arc, ARC 2; and an equatorial zone arc, ARC 3. It is preferred that adjacent arcs are continuous and tangent at each intersection 200, 205. It is also preferred that the pole arc ARC 1 is perpendicular to the polar axis 210 and the equator arc ARC 3 is perpendicular to the equator plane $E_p$ where they intersect those entities, i.e., at the pole P and the equator edge 120.

In the preferred embodiment shown in FIG. 6, each of the arcs ARC 1, ARC 2, ARC 3 extends an angle of θ1, θ2, and θ3, respectively, which all equal to about 30°. Any number of other configurations are possible as well, such as ARC 1 extending θ1 of about 20°, ARC 2 extending θ2 of about 50°, and ARC 3 extending θ3 of about 20°.

Referring back to FIG. 6, each of the three arcs ARC 1, ARC 2 and ARC 3 has a different center point, CENTER 1, CENTER 2, CENTER 3, respectively, and arc length $S_1$, $S_2$, $S_3$, respectively. The arc length, S, is defined as $S_i = R_i * \theta_i$, where i=1, 2 or 3 for each ARC, and R is the arc radius.

Many combinations of lengths and center points may be suitable to form continuous profile 145, but it is preferred that ARC 1 and ARC 3 have the same length radii designated R1, R3, respectively, and that ARC 2 has a smaller radius designated R2. This creates a bulge 195 at a point halfway between the pole P and the equator edge 120 that extends by a bulge distance B (not shown) but calculated as (A+B)−A, where A is a nominal radius of the hob. The bulge distance is measured at 45° from equator plane Ep. Thus, bulge 195 extends by an amount or bulge distance B greater than the nominal radius A of the hob.

The locations of CENTER 1, CENTER 2 and CENTER 3 are indicated on FIG. 6 by dimensions C and D from origin point 0 located directly below pole P on polar axis 210 and on equator plane $E_p$. Dimensions C and D are geometrically dependent on nominal radius A and bulge distance B and are calculated using a conventional parametric modeling Computer Aided Engineering system, such as SolidWorks, or other systems known in the art.

EXAMPLES

These and other aspects of the present invention may be more fully understood with reference to the following non-limiting examples, which are merely illustrative of the embodiments of the present invention hob, and are not to be construed as limiting the invention, the scope of which is defined by the appended claims. All parameters and definitions reference FIG. 6.

Example 1

| Parameter | Definition | Value (Inches) |
| --- | --- | --- |
| R1 | Radius of ARC 1 | 0.8550 |
| R2 | Radius of ARC 2 | 0.8414 |
| R3 | Radius of ARC 3 | 0.8550 |
| A | Nominal Hob Radius | 0.8500 |
| B | Bulge Distance | 0.0010 |
| C | CENTER 1 Axial Offset | 0.0050 |
|   | CENTER 3 Lateral Offset | 0.0050 |
| D | CENTER 2 Axial Offset | 0.0068 |
|   | CENTER 2 Lateral Offset | 0.0068 |

Example 2

| Parameter | Definition | Value (Inches) |
| --- | --- | --- |
| R1 | Polar Zone Radius | 0.8601 |
| R2 | Intermediate Zone Radius | 0.8331 |
| R3 | Equatorial Zone Radius | 0.8601 |

-continued

Example 2

| Parameter | Definition | Value (Inches) |
| --- | --- | --- |
| A | Nominal Hob Radius | 0.8500 |
| B | Bulge Distance | 0.0020 |
| C | CENTER 1 Axial Offset | 0.0101 |
|   | CENTER 3 Lateral Offset | 0.0101 |
| D | CENTER 2 Axial Offset | 0.0134 |
|   | CENTER 2 Lateral Offset | 0.0134 |

Example 3

| Parameter | Definition | Value (Inches) |
| --- | --- | --- |
| R1 | Polar Zone Radius | 0.8705 |
| R2 | Intermediate Zone Radius | 0.8169 |
| R3 | Equatorial Zone Radius | 0.8705 |
| A | Nominal Hob Radius | 0.8500 |
| B | Bulge Distance | 0.0040 |
| C | CENTER 1 Axial Offset | 0.0205 |
|   | CENTER 3 Lateral Offset | 0.0205 |
| D | CENTER 2 Axial Offset | 0.0262 |
|   | CENTER 2 Lateral Offset | 0.0262 |

In comparison, a conventional spherical hob typically has a profile with R1=R2=R3=A=0.8466 inches, and B=C=D=0 inches.

The dimensions of the hob may be obtained by measuring many golf balls to determine the average deviation from a perfect sphere. Using the average deviation, the hob can be formed into the modified hob of the present invention. One of ordinary skill in the art, however, will appreciate that other methods may be used to determine the dimension of the hob.

The present invention also includes a method of making golf balls having an increased degree of sphericity as compared to prior art golf balls made with spherical hobs. This method is illustrated in FIGS. 7A–C. As shown in FIG. 7A, the method begins with providing a top golf ball mold half 126a and a bottom golf ball mold half 126b similar to mold 126 in FIG. 5. Each mold half has a cavity 132 with an imperfectly spherical arcuate surface, as described above. The mold halves 126a, 126b are positioned such that their cavities 132 define a golf ball mold cavity 215 (as shown in FIG. 7B) with substantially the same size as a finished, unpainted golf ball to be formed within the halves.

Still referring to FIGS. 7A and B, a golf ball subassembly 220 is placed into the golf ball mold cavity 215. This can be done manually or it can be done automatically according to the disclosure of U.S. Pat. No. 6,042,768 to Calabria, et al., which is hereby incorporated by reference in its entirety. Half shells 223 of cover material 225 are disposed between subassembly 220 and mold cavities 132. The details of this step are also disclosed in U.S. Pat. No. 6,042,768.

Next, the mold cavities 132 form the cover material 225 around the subassembly 220, as is shown in FIG. 7B. This can be accomplished, for example, by compression molding, injection molding, casting, reaction injection molding, thermoforming, curing, polymerization, or various other methods of forming a cover layer known by one of ordinary skill in the art. The cover material 225 is preferably cooled before removal of the mold halves 126a, 126b.

After the cover material 225 has been formed, the top golf ball mold half 126a and bottom golf ball mold half 126b can be removed, resulting in the molded golf ball 240, shown in FIG. 7C. Golf ball 240 includes dimples 244 formed by projections 135 (see FIG. 5) in the mold half 126.

Figure 8:
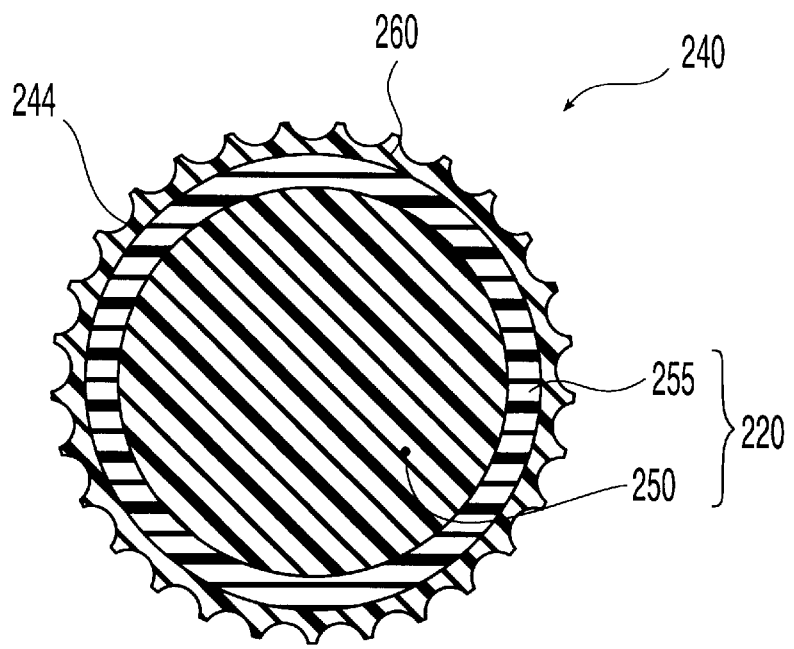
FIG. 8 is a cross-sectional view of a golf ball made in accordance with the method of the present invention.

Referring to FIG. 8, the golf ball 240 formed according to the method in FIGS. 4 and 7A–C, includes subassembly 220 of a solid, two-piece core construction comprising a center 250 of polybutadiene surrounded by at least one intermediate layer 255 of ionomer resin. Preferably, the ionomer resin of the intermediate layer 255 has an acid content of less than 20 weight percent. Alternatively, the subassembly 220 can include a solid or liquid-filled center 250 having at least one intermediate layer 255 of thread rubber, or other materials, wound around it.

Still referring to FIG. 8, the cover material 260 is a thermoset polyurethane having dimples 244 formed therein. The cover material 260 can be formed on the subassembly 220 by casting, compression molding, injection molding or reaction injection molding, or any other method. Alternatively, the cover material 260 is an ionomer, a blended material containing at least partially an ionomer, or another suitable thermoplastic elastomer.

Figure 9:
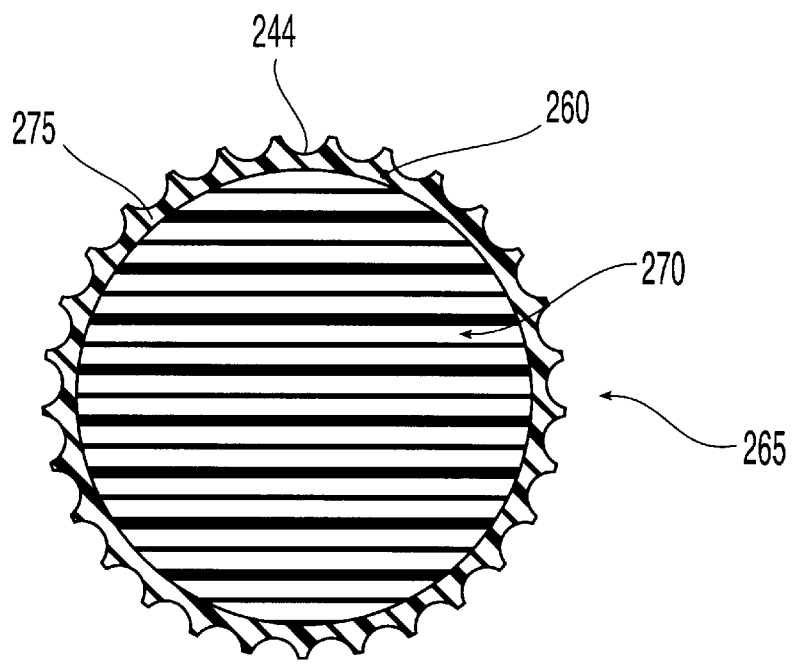
FIG. 9 is a cross-sectional view of another embodiment of a golf ball made in accordance with the method of the present invention.

FIG. 9 shows a cross-sectional view of another embodiment of a golf ball 265 made according to the present invention. Golf ball 265 has a core 270 surrounded by a cover material 275 that forms the outside of the golf ball 265 and which defines the dimples 244 therein. In this embodiment, the golf ball subassembly is a single piece or the core 270 of a molded, solid construction.

It will be understood that the claims are intended to cover all changes and modifications of the preferred embodiments of the invention, herein chosen for the purpose of illustration, which do not constitute departures from the spirit and scope of the invention.

What is claimed is:

1. A method of making a golf ball comprising:
    a. providing first and second golf ball mold halves, each mold half having a cavity with an arcuate surface defined by at least two arcs having different center points;
    b. placing a golf ball subassembly into a golf ball mold cavity defined by the cavity of the first golf ball mold half and the cavity of second golf ball mold half wherein the golf ball mold cavity has a degree of sphericity;
    c. disposing a cover material within the golf ball mold cavity around the subassembly, and
    d. removing the subassembly with the cover material thereabout thereby providing a molded golf ball having a high degree of sphericity greater then the degree of sphericity of the golf ball mold cavity.

2. The method of claim 1, wherein the golf ball subassembly is a solid core.

3. The method of claim 1, wherein the golf ball subassembly comprises a center of polybutadiene and at least one intermediate layer formed around said center.

4. The method of claim 3, wherein the at least one intermediate layer is a thermoplastic polyurethane.

5. The method of claim 3, wherein the at least one intermediate layer is an ionomer resin with an acid content of less than 20 weight percent.

6. The method of claim 1, wherein the golf ball subassembly is a two-piece core comprising a solid center and an intermediate layer wound around said center.

7. The method of claim 1, wherein the golf ball subassembly is a two-piece core comprising a liquid filled center and an intermediate layer wound around said center.

8. The method of claim 1, wherein the cover material is a thermoset polyurethane.

9. The method of claim 1, wherein the cover material is a castable polyurethane.

10. The method of claim 1, wherein the cover material is an ionomer or an ionomer blend.

11. The method of claim 1, wherein the cover material is a thermoplastic elastomer or a thermoplastic polyurethane.

\* \* \* \* \*